United States Patent [19]

Jellies

[11] 4,088,863

[45] May 9, 1978

[54] CORDLESS MEAT PROBE FOR MICROWAVE OVEN

[75] Inventor: David A. Jellies, Galesburg, Ill.

[73] Assignee: Rockwell International Corporation, Pittsburgh, Pa.

[21] Appl. No.: 798,754

[22] Filed: May 20, 1977

[51] Int. Cl.² .......................... H05B 9/06; G01K 1/08
[52] U.S. Cl. ................................ 219/10.55 E; 73/352; 219/10.55 B
[58] Field of Search ....................... 73/352, 371, 378.3, 73/355; 219/10.55 R, 10.55 E, 10.55 B

[56] References Cited

U.S. PATENT DOCUMENTS

| | | | |
|---|---|---|---|
| 2,916,915 | 12/1959 | Burgert | 73/352 |
| 3,097,530 | 7/1963 | Weksler | 73/352 X |
| 3,241,370 | 3/1966 | Mertler et al. | 73/352 |
| 3,849,622 | 11/1974 | Merriam | 219/10.55 E |
| 3,974,696 | 8/1976 | Fitzmayer | 219/10.55 E X |
| 3,975,720 | 8/1976 | Chen et al. | 219/10.55 E X |
| 3,988,930 | 11/1976 | Fitzmayer et al. | 219/10.55 R X |
| 3,991,615 | 11/1976 | Hornung | 219/10.55 R X |

Primary Examiner—Arthur T. Grimley

[57] ABSTRACT

In a microwave oven, a cordless probe for monitoring the temperature of the substance being cooked. The probe has an ionizable gas in a bulb which emits a glow when activated by the microwaves. When the preselected temperature is reached, the bulb is covered with a shield, thus quenching the emissions. The probe can be used alone, in which case the operator must visually monitor the probe, or in combination with a circuit containing a photosensitive element to monitor the probe condition.

8 Claims, 4 Drawing Figures

U.S. Patent     May 9, 1978     4,088,863
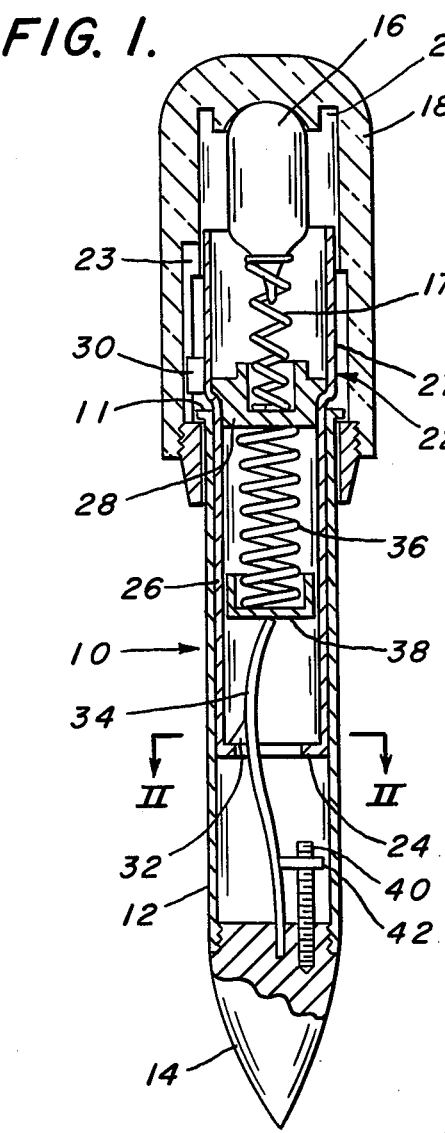
FIG. 1.
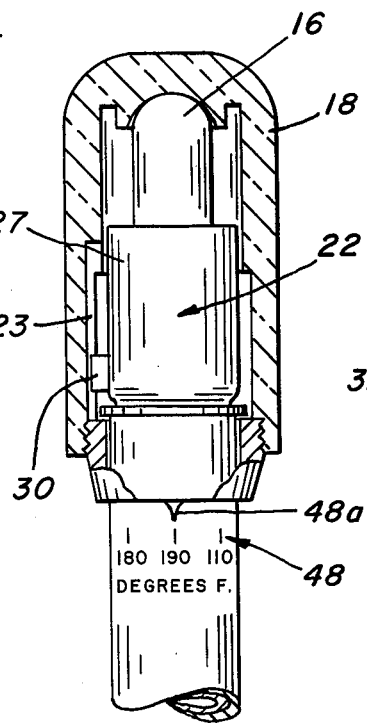
FIG. 2.
FIG. 3.
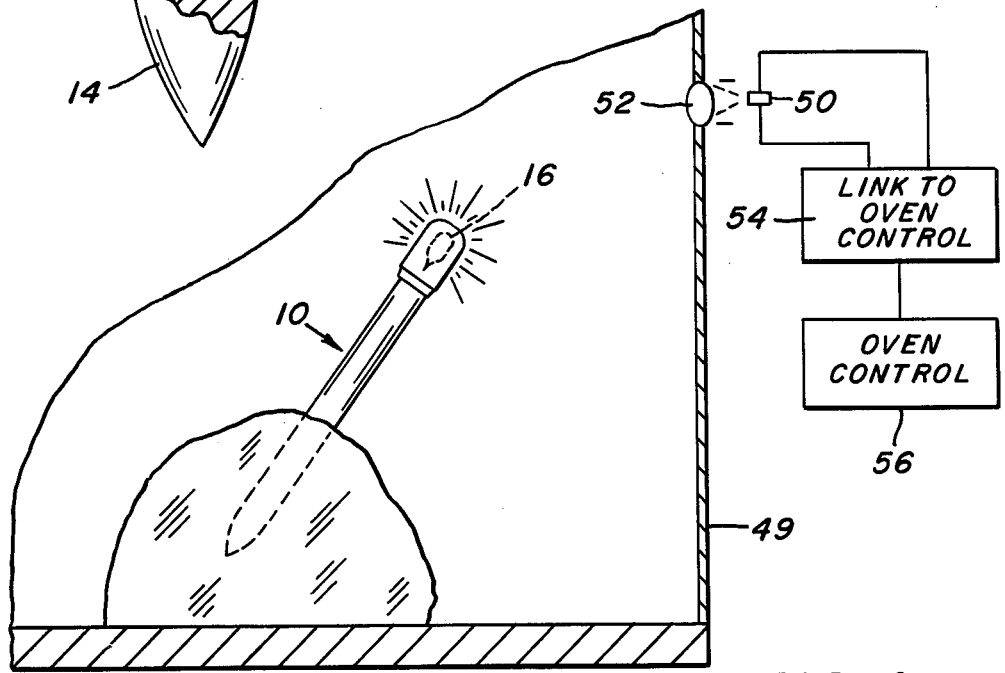
FIG. 4.

CORDLESS MEAT PROBE FOR MICROWAVE OVEN

BACKGROUND OF THE INVENTION

Microwave ovens have recently become extremely popular. They have many desirable attributes, and have been designed for home use as well as commercial installations. One of the differences between microwave cooking and the more conventional ways is the speed with which the microwave cooking is accomplished. Another difference is the lack of visual indication that the oven is "on."

One improvement is the provision of a temperature probe. Several manufacturers provide a probe (commonly called a "meat probe") for insertion into the article being cooked. These prior art devices, however, require a connection to an indicator outside the oven. This connection, usually a shielded conductor wire or the like, makes the probe awkward and cumbersome to manage and manipulate. There is also a chance that this connection can become caught in the door and produce a radiation and/or shock hazard.

SUMMARY OF THE INVENTION

It is therefore an object of this invention to provide a cordless probe for microwave ovens.

It is another object to provide a cordless probe that gives a visual indication of the status of the cooking cycle.

It is a further object of this invention to provide a cordless probe that can be used in conjunction with control circuitry to shut off the power to the oven when the article being cooked reaches a preselected temperature.

It is a further object of this invention to provide a cordless probe that can be preset to a desired temperature, which will give a visual indication of attainment of the selected temperature.

It is another important object to provide a cordless probe that can be used with existing ovens without modification of the existing equipment.

It is another object of this invention to proivde an adjustable temperature indicator which is easy to manufacture, economical, and dependable in operation.

BRIEF DESCRIPTION OF THE DRAWINGS

The invention is illustrated in the accompanying drawing, in which:

FIG. 1 is a longitudinal sectional view of the probe, with a portion of the tip of the probe unsectioned;

FIG. 2 is a section along II—II of FIG. 1;

FIG. 3 is a view partly in section of a portion of the probe of FIG. 1, showing external features of the probe; and, FIG. 4 is a diagrammatic view of a portion of the oven with the probe in place in the article being heated and the control circuitry in place in a wall of the oven.

DESCRIPTION OF A PREFERRED EMBODIMENT

Referring to the drawing, and more particularly to FIGS. 1 and 3, there is shown a cordless probe 10 for monitoring the temperature of a substance being heated, or cooked. The probe 10 has an exterior cylindrical body 12, to which is fastened a nose cone 14 at one end. Fixed in the other end of the cylindrical body 12 is a bulb 16 which containes neon or other ionizable luminescent gas. This bulb may be held in place by the force of light spring 17. Bulb 16 in turn pushes slidably mounted top 18 to the extended position against lip 11. The top 18 is made of visible and microwave radiation transparent material.

Slidably mounted within body 12 is a shield assembly 22. Shield assembly 22 consists of a latching ledge 24 on the bottom of cylindrical barrel 26 and a spring seat 28 permanently affixed into the expanded upper cylindrical part of barrel 26. Lug 30 on barrel 26 slidably engages slot 23 in top 18. In the position shown in FIGS. 1 and 3 the shield assembly 22 is retained in the retracted position, leaving bulb 16 exposed. The assembly is retained by a latch 32 on a bimetallic temperature sensitive member 34, against the bias of a spring 36. One end of the bimetallic member 34 is fixed in nose 14, and the other end supports a spring seat 38. An adjusting screw 40 mounted in the nose cone 14 carries a small desk-like shoulder 42 for calibrating bimetal element 34. Friction between bimetal 34 shoulder retains the adjusted position.

Referring now more particularly to FIG. 3, we see that the top 18 is rotatable about exterior of body 12 and engages barrel 26 through lug 30. the barrel 26 is rotatable in body 12 to adjust latching ledge 24 engagement with latch 32. As can be seen from FIG. 2, ledge 24 varies in width (radially) and thus provides more or less bearing for latch 32 as barrel 26 is rotated. Indicia 48 is provided on body 12 and a pointer or similar indicator 48 (a) is provided on top 18. Thus a desired temperature can be preset at which temperature the latch 32, being moved by bimetal element 34, is withdrawn from ledge 24.

In operation, the probe is set as described above, by relative rotation of the top 18 and body 12, and the barrel is then latched by interengagement of latch 32 and ledge 24, by depressing top 18 which engages shield 27 in recess 25 causing barrel 26 to move against the bias of spring 36, after which light spring 40 causes top 18 and bulb 16 to rise to the extended position.

The probe is then inserted, point first, into the material whose temperature is to be monitored, and all then placed in the microwave oven and the oven is started. The bulb 16 will glow under the influence of the microwaves until the preset temperature is attained. At that time, the bimetallic member 34 pulls latch 32 inwardly towards the longitudinal axis of the probe, releasing shield assembly 22. Spring 36 moves the shield assembly upwardly and shield 28 surrounds bulb 16, closing off bulb 16 from the microwaves (and incidentally from the view of the oven operator). This is the indication that the desired temperature has been attained.

FIG. 4 shows one of the ways in which this visual indicia may be used. The probe 10, with glowing bulb 16 inside an oven 49 emits visible light which is observed by a photosensitive element 50 through a lens 52 in the wall of the oven. Element 50 is part of a circuit 54 which is built into the oven control circuitry 56. These elements, all well known in the electronics art, are used to maintain the supply of power to the oven so long as the bulb 16 glows. Once the desired temperature is reached, the latch 32 releases the shield assembly 22, which moves under the bias of spring 36 to overcome the small force of light spring 4 and to cover bulb 16 located in top 18. This cuts off the microwave supply to the bulb, extinguishing the glow, and through element 50 and circuit 54, interrupting the supply of power to the oven. Circuit 54 has suitable time-delay mechanism built in, so that momentary flickering of bulb 16 does not trip the power switch.

The oven controls 56 are shown separately, so that the oven can be operated in other ways, if so desired, in addition to the automatic shut-off described above.

From the foregoing it will be seen that a probe having no dangling "umbilical cord" to contend with, one that uses the power generated within the oven itself has been developed for use as a temperature sensing element in existing microwave ovens as well as having the capacity of being incorporated into automatic shut-off circuitry in new ovens.

What is claimed:

1. A probe for use in a microwave oven comprising, a generally tubular housing, temperature sensing means mounted in said tubular housing, latching means for cooperating with said sensing means, shield means fixed to said latching means, spring means for biasing said shield, and a gas-filled glass envelope mounted on said tubular housing.

2. The probe of claim 1, wherein said gas-filled glass envelope contains neon or a like ionizable luminescent gas, sensitive to the microwaves used in said oven.

3. The probe of claim 1, in which said sensing means releases said latching means upon said probe reaching a preselected temperature.

4. The probe of claim 1, in which said latching means is adjustable to any of a range of temperatures.

5. A probe for use in a microwave oven comprising, a generally tubular housing having one end adapted for insertion into the material being monitored, a bimetallic temperature sensing element mounted in said tubular housing adjacent said one end, a cylindrical shielding assembly longitudinally slidably mounted coaxially in said housing and having a latching means engageable with said sensing element, spring means biasing said shielding assembly toward the other end of said housing from said one end, a glass bulb mounted in said other end containing an ionizable luminescent gas responsive to the microwaves to emit visible glow, and adapted to be selectively exposed to said microwaves when said oven is operating and said shielding assembly is in latching engagement with said sensing element, and covered when said shielding assembly is released from latching engagement with said sensing element.

6. In a microwave oven for food preparation and like uses, the combination of a temperature sensing probe having an ionizable luminescent gas bulb responsive to the microwaves used for cooking, and a light sensitive electronic circuit for controlling the supply of power to said oven, said probe comprising a generally tubular housing having one end adapted for insertion into the material being monitored, a temperature sensing element mounted in said housing and having latching means and biasing means connected thereto, said glass bulb being mounted in the other end of said probe from said one end and adapted to be selectively exposed to said microwaves when said oven is operating, whereby said light sensitive circuit maintains the supply of power to said oven.

7. The combination of claim 6, wherein said light sensitive electronic circuit interrupts the supply of power to said oven when the light from said bulb is interrupted for more than a brief period.

8. The combination of claim 6, wherein said latching means includes means for adjustably selecting the temperature at which said shielding assembly is released to cover said bulb, thus interrupting the luminescense and actuating said electronic circuit.

* * * * *